A. W. TWEEDEN.
ANTISKIDDING BRAKE.
APPLICATION FILED JULY 9, 1918.

1,323,934.

Patented Dec. 2, 1919.

Inventor
Andrew W. Tweeden

By Mason Fenwick Lawrence,

Attorneys

UNITED STATES PATENT OFFICE.

ANDREW W. TWEEDEN, OF TACOMA, WASHINGTON.

ANTISKIDDING BRAKE.

1,323,934.

Specification of Letters Patent.

Patented Dec. 2, 1919.

Application filed July 9, 1918. Serial No. 244,096.

*To all whom it may concern:*

Be it known that I, ANDREW W. TWEEDEN, a citizen of the United States, residing at Tacoma, in the county of Pierce and State of Washington, have invented certain new and useful Improvements in Antiskidding Brakes; and I do hereby declare the following to be a full, clear, and exact description of the invention, such as will enable others skilled in the art to which it appertains to make and use the same.

This invention relates to vehicles, and more particularly to brake mechanism for wheeled vehicles.

It is one of the objects of the present invention to provide a means which will operate to prevent the forward and lateral skidding of vehicles, such for instance as automobiles. It is a further object of the invention to provide a simple, substantial, easily operated and comparatively inexpensive form of brake mechanism which can be quickly controlled at the will of the vehicle operator or driver, so as to be thrown into braking position when necessary, and which can be readily lifted by the operator to a position clear of the roadway when the device is out of use. Another object of the invention is to provide a device of this type which can be connected to vehicles of different types of construction without any substantial changes in the construction of the vehicle and without expensive attachments or machining or other variations in the standard construction.

With the above objects in view the invention consists in the construction, the combination, and in details and arrangements of the parts as more fully described hereinafter relative to the embodiment of the invention, illustrated in the accompanying drawing, in which—

Figure 1:
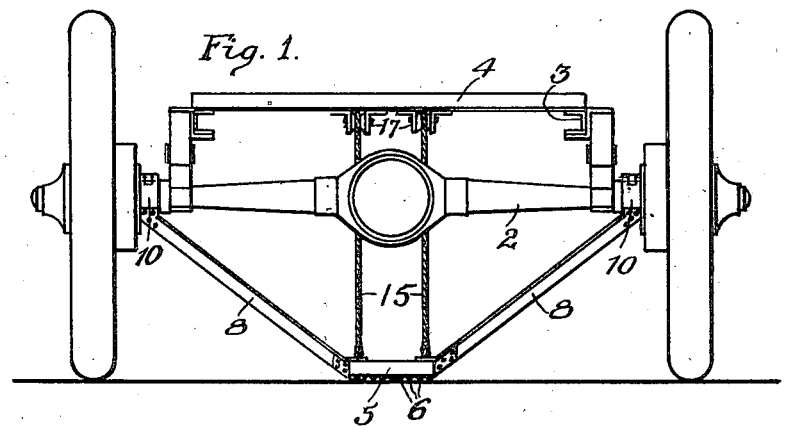
Figure 1 is a rear end elevation of the rear wheel and axle, and frame showing the device as applied and in braking position.
Figure 2:
Fig. 2 is an elevation of the detached axle.
Figure 3:
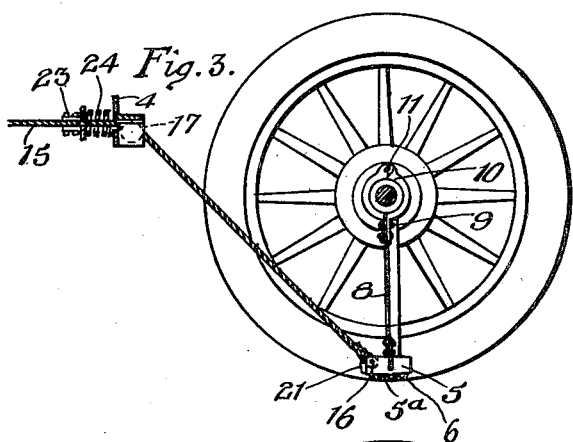
Fig. 3 is a transverse section through the axle and a member of the frame.
Figure 5:
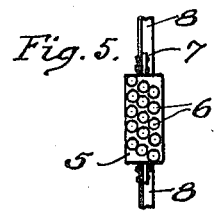
Fig. 5 is an underneath plan view of the shoe showing the arms of the frame broken away.
Figure 4:
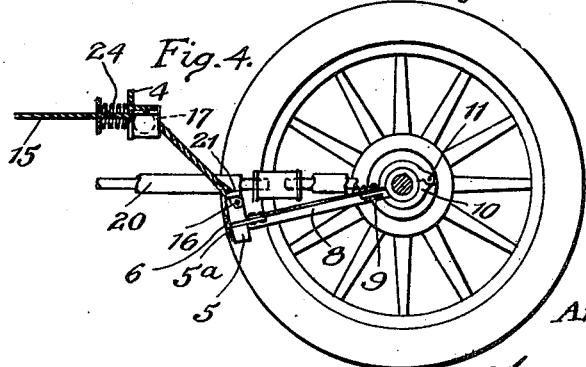
Fig. 4 is a similar view showing the brake in elevated position.

As above suggested, the device may be applicable to vehicle structures of various types and in the present instance it is designed to be attached to a vehicle having an axle structure 2 and a frame 3, the latter of which is provided in this case with a transverse, fixed part 4. The device comprises essentially a shoe 5 in the form here shown of an oblong block of suitable proportions, and which may be of cast iron or other material, the lower face of which is roughened as by knobs 6 and at each end there is provided an ear or lug 7 which is riveted or otherwise suitably connected to the vertical flanges of angle irons or arms 8 to the upper end of each of which there is shown as riveted or otherwise suitably secured as at 9 a form of bearing preferably of the split ring type illustrated at 10, the sections being pivoted at 11 diametrically opposite to the fastening means 9 so that the sectional bearing ring 10 can be closed about its pivot 11 and then the opposed ends are secured together as at 9. Preferably the arms converge from the bearing rings 10 which embrace the outer portions of the axle 2 downwardly to a position substantially vertically below the medial vertical plane longitudinally of the vehicle frame so that the shoe 5 when in the position shown in Figs. 1 and 3 assumes a position vertically below the center of the axle. To facilitate the raising and lowering of the shoe by the swinging of the frame formed by the arms 8, one form of controlling means is illustrated as comprising a pair of cables 15—15 each of which is connected at 16 to the forward side of the shoe 5 which latter is clearly shown in Fig. 3 as having its bottom face curved as at $5^a$ substantially concentric to the axes of the axle 2. The cables 15 are extended upwardly over suitable guide pulleys 17 which are mounted on the lower face of the fixed member 4 from which the cables 15 extend forwardly to any suitable form of operating means such for instance as a suitably operated drum or segment not necessary to be here shown, and by which the cables 15 can be secured to hold the brake frame in the position shown in Fig. 2 until the operator may desire to release it and permit it to fall to the braking position shown in Figs. 1 and 3. When the shoe 5 is swung about the axle 2 to the position shown in Fig. 4, it may be brought up against the drive shaft 20 shown in Fig. 4, and it is therefore preferably provided with a buffer 21 which may be of rubber or other suitable cushioning material.

It is desirable that when the brake is lowered to a position vertically below the axle 2 the vehicle and the brake elements are protected against the sudden shocks engendered by the contacting of the shoe with the roadway surface, and to that end a suitable yielding or resilient stop or abutment device or cushion is provided, and as here illustrated comprises a pair of bumpers or collars 23, one of which is secured on each lifting rope 15, these being adapted to move rearwardly against springs 24 supported on the face of the transverse fixed member 4 of or on the frame. The action will be such that when the operator releases the lifting cables 15 the brake will rapidly drop to contact position with the ground or roadway surface due to the action of gravity on the shoe and the strut arms, and as the brake engages the roadway surface the bumpers 23 engage the respective springs 24 and these act as cushioning means so as to cause the gradual application and reaction of the brake.

From the above it will be seen that the forward momentum or skidding tendency of the vehicle will be materially retarded when the brake is lowered to operative position, and similarly the laterally skidding of the vehicle will be retarded.

What is claimed is:

The combination with a vehicle having a frame whose parallel sides are connected by a cross-piece, and a wheeled axle on which the frame is mounted; of a brake block or shoe disposed beneath the center of the axle, upwardly and outwardly inclined arms connected to the block and pivoted to swing on an axle to carry the block forwardly, guide pulleys mounted on the lower side of the cross-piece, and a pair of control ropes threaded through the pulleys and connected to the block, the ropes passing on respective sides of the transmission mechanism, the arms each comprising a piece of L-iron with one flange extended over the top of the block to strengthen the connection therewith.

In testimony whereof I affix my signature.

ANDREW W. TWEEDEN.